May 26, 1964  H. S. McCONKIE  3,134,418
TIRE VALVE STEM
Original Filed Feb. 26, 1958  2 Sheets-Sheet 1
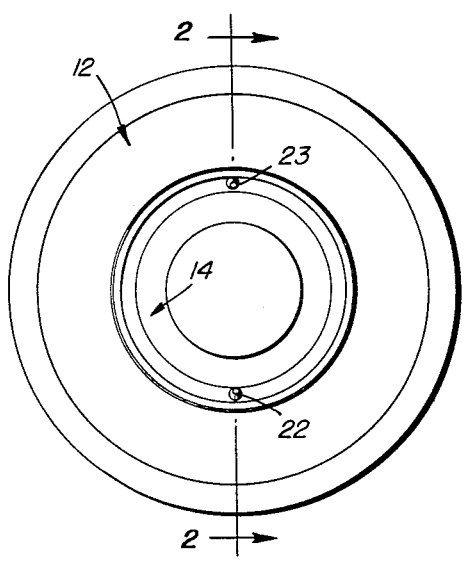
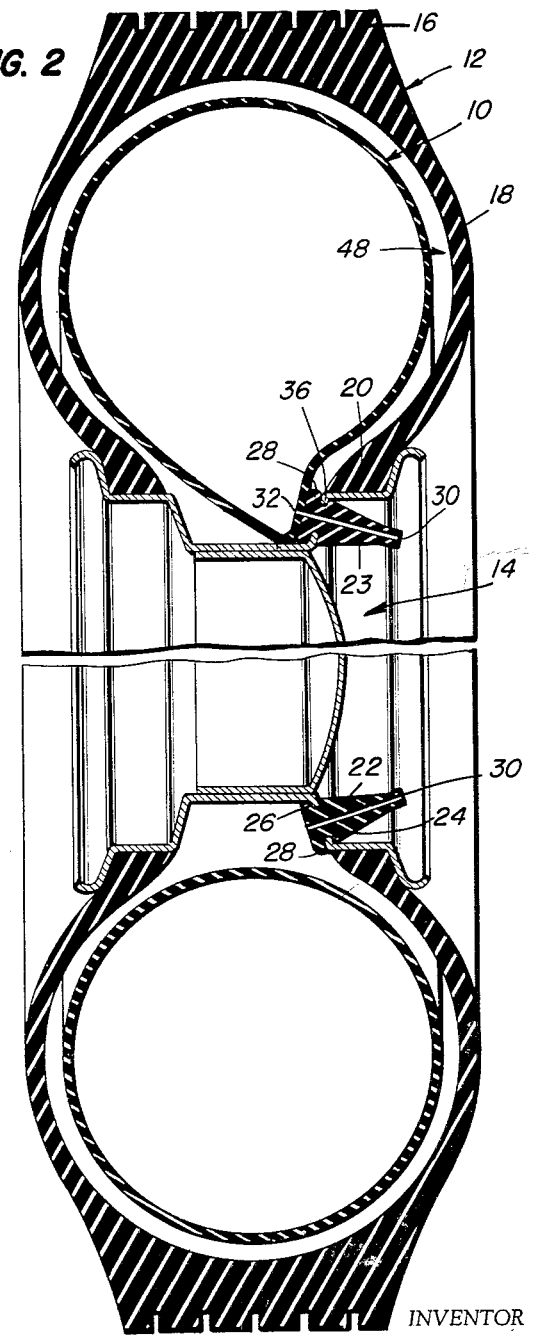
INVENTOR
HOWARD S. McCONKIE
BY *Imirie and Smiley*
ATTORNEYS May 26, 1964  H. S. McCONKIE  3,134,418
TIRE VALVE STEM Original Filed Feb. 26, 1958  2 Sheets-Sheet 2

INVENTOR
HOWARD S. McCONKIE

BY *Irwine and Smiley*
ATTORNEYS

United States Patent Office 3,134,418
Patented May 26, 1964

3,134,418
TIRE VALVE STEM
Howard S. McConkie, 101 Etter St., Hot Springs, Ark.
Original application Feb. 26, 1958, Ser. No. 717,624, now Patent No. 3,038,516, dated June 12, 1962. Divided and this application Mar. 26, 1962, Ser. No. 182,395
3 Claims. (Cl. 152—427)

This invention relates to tires and more particularly to a tubeless tire provided with one or more inner tubes for blowout protection and is a division of copending application Serial No. 717,624, filed February 26, 1958, now Patent No. 3,038,516, June 12, 1962.

While tubeless tires have gained general commercial acceptance, they are subject to a number of disadvantages. These include: vulnerability to blowout or sudden collapse with consequent danger to the occupants of the vehicle; difficulty in installing and need for special tools to mount the tires on wheel rims; the danger of rolling the tires off the wheels on sharp turns when mounted on heavy or fast vehicles; the inability of readily ventilating the interior of the tire to prevent rotting by water condensed therein; and the difficulty of locating small leaks or blemishes in the tire without dismounting the tire or the wheel.

It is a primary object of this invention to obviate these disadvantages by provision within a tubeless type tire of an inner tube whose valve stem is air sealed to the rim upon which the tire is mounted to preserve the air sealing chamber within the tubeless type tire.

It is a further object of the invention to provide a plurality of air compartments within a tubeless type tire so that the wheel may be continued to be used safely even after sudden puncture of the tire.

Another object of the invention is to provide an inner tube within a tubeless type tire, the tube being inflated to a much greater pressure than the tire so as to carry most of the load while the lower pressure in the tire prevents pinching of the tube, provides ventilation of the tube and tire, and provides a test pressure of the tire to determine small leaks, cracks and other flaws before they become serious.

Yet another object of the invention is to provide an inner tube for a tubeless type tire which is easy to mount and inflate and which enables the tubeless type tire itself to be more easily mounted and inflated.

A further object is to provide in a safety tube, for use within a conventional tubeless type tire, a valve stem which protrudes through a different opening in the rim than that used for passage of the tire inflation valve stem, and which may be air sealed at said opening in a number of ways including the use of a portion of the tube or tube stem to provide such air seal.

Another object is to provide multiple airways in one self-sealing valve stem.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a side elevation of a wheel assembly embodying the invention which includes a tubeless type tire mounted on a drop center rim and assembled with an inner tube within the tire;

FIG. 2 is an enlarged section of the tire assembly taken on line 2—2 of FIG. 1;

Figure 3:
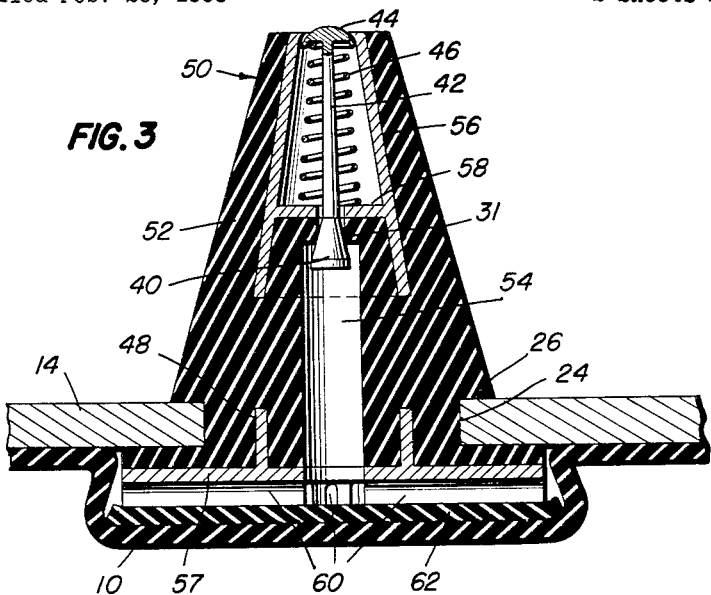
FIG. 3 is a greatly enlarged axial section showing a modified tire valve stem and valve assembly with the fragmentary inner tube shown under condition of tire puncture.
Figure 4:
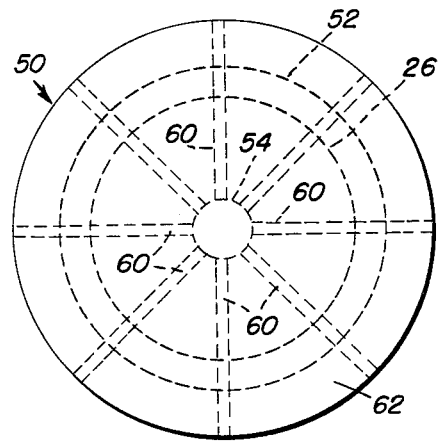
FIG. 4 is a bottom plan view of the tire valve stem shown in FIG. 3.

Referring now to the drawings, the invention is shown in FIGS. 1 and 2 embodied in an inner tube, indicated generally at 10, which is semifloated within a conventional tubeless type tire 12 mounted on a drop center rim 14. The details of construction of the tire are well-known to those skilled in the art and need not be described here. It is sufficient to say that the tire has the usual tread 16, sidewalls 18 and beads 20.

Tire 12 is inflated by means of one or more valve stems 22, FIG. 2, and assembled valves, not shown. The valve stem 22 is formed of resilient material and pulled through an opening 24 in the rim 14. During this operation, the conical portion of the stem is compressed until the walls of the rim opening 24 fall within an annular groove 26 in the valve stem at which time the walls of the stem groove expand to grasp the rim opening in air sealing engagement. The annular groove 26 is positioned between the conical portion of the stem and a disclike flange 28. The valve stem is provided with a bore 30 for reception of a valve assembly.

The inner tube 10, which may also be of conventional construction as used with tubed tires, is slightly modified in the drawing, and comprises a thin walled, endless rubber tube, doughnut shaped when inflated, to which may be cemented, vulcanized, or otherwise secured, a valve stem 23 for protrusion through a second opening 36 in the rim 14.

The tire 12 may be inflated with air under pressure exceeding atmospheric pressure, and it is, therefore, of the utmost importance that the opening 36 in the rim 14, for passage of the inner tube valve stem, be air sealed to prevent loss of pressure in the tire. A number of different types of conventional inner tube valve stems may be used provided that they are modified to accomplish such air sealing of the rim opening.

The tapered compressible valve stem 23 is similar to stem 22, but its base 28 is vulcanized to the tube 10 with the tube opening 32 in alignment with the stem air channel 30. Between the disclike flange 28 and the tapered portion 29, is formed the channel or groove 26 whose walls engage the wall of the rim opening 36 with airtight pressure.

To mount the tire 12 and tube 10 on rim 14, one bead of the tire is forced over the rim flange. The inner tube is then placed in the tire and the valve stem 23 is inserted in the rim opening 36 from the inside and pulled through the opening compressing the conical body of the valve until the valve stem groove 26 closes about the rim wall surrounding the opening. If desired, the walls of the groove 26 may be coated with cement which upon hardening will further ensure permanent air sealing of opening 36. The tubeless tire valve stem is similarly installed and then the second bead of the tire is mounted. The operator next inflates the inner tube with the desired mounting pressure. For example, this pressure may be in the order of 40 lbs./square inch. The tube 10 will expand to fill the entire space within the tire 12 forcing the beaded edges 20 into air sealing engagement with the adjacent flanges of rim 14.

Normally, tubeless type tires require a special tool to be applied circumferentially to the tread to compress the tire radially and spread the side wall edges into sealing engagement with the rim, and such tools require two men to position and operate them. The use of the inner tube whose inflation accomplishes this task quickly and easily eliminates the need for such special tools. Therefore, an important advantage is derived apart from the safety gained by the double air chamber formed by the addition of an inner tube.

The mounting tube is retained in the tire to function as a safety tube. Since the tube, during the mounting process, occupies all the tire space, it can again fill the tire in an emergency. Tube pressure is now reduced to the figure desired in an emergency, for example, 20 pounds. Then, air is applied to the tubeless tire valve stem and pressure raised to the desired operating level, for example, 30 pounds. Since the pressure in the tire is higher than that in the tube, the latter will be compressed against its self-contained air and, at such time, the pressure in the tube will equal that in the tubeless tire air space. This pressure will compress the tube and move it away from the inner surface of the tire 12 leaving a space 48 completely surrounding the tube 10 except in the area where the tube is secured to valve stem 23.

The assembly of a tubeless type tire with an inner tube in the described manner presents a number of additional important advantages. First, if the tire 12 is punctured or blows out, no danger will result to the occupants of the vehicle since the inner tube 10 will then expand to occupy the entire space within the tire and the wheel may be driven in this condition for an indefinite period of time.

Second, the space 48 between the inner tube and the tire prevents pinching of the tube in contrast to normal tubed tires in which the tube completely fills the space inside the tire and is constantly subjected to rubbing, chafing, and pinching by the inner wall of the tire.

Tubeless tires may be mounted on rims utilizing valve stems which are partially metallic, similar to that illustrated in FIG. 3. When valve stem 50 is used in place of the valve stem 22 of FIG. 2, it is advisable to protect the inner tube from rubbing against metallic parts and, particularly, sharp metallic edges. In FIG. 3, the inner tube 10 is pictured as pressing against the valve stem as would be the condition in case of puncture of the tire. Valve stem 50 comprises a tapered portion 52 of flexible material in which is molded an internal, reinforcing hollow member 56 of metal which also houses the valve assembly. A tapered inverted valve 40 is biased to closing position in the bore 54 against the reduced opening formed by the shoulder 31. Bias for the valve is supplied by the coil spring 46, one end of which bears against the inturned annular shoulder 58 on member 56, and the other end of which bears against the cap 44 secured to valve 40 by rod 42 and held in the mouth of member 56.

Separated from member 56, to permit compression of portion 52 during mounting, is another tubular reinforcing member 48 provided with a disclike lateral extension 57 having radial grooves 60 formed in its under surface. Each of the grooves 60 communicates with the central bore 54 of the valve stem. To protect the tube 10 from chafing against the edges of the grooves 60 or the edges of disc 57, a cover 62 which may be integral but preferably is in the form of a flap of relatively thin flexible material is secured to the under side of the disc. The securement may be by cementing of the flap over its entire inner surface to disc 57, or by cementing only portions of the flap 62. In either case, if the tire is punctured and tube 10 comes into contact with the tire valve stem 50 even for a considerable period of time while the vehicle is driven supported by the tube, no damage to the inner tube can result. In addition, the flap 62 prevents the tube 10 from being forced by its own pressure and the weight of the vehicle into the air bore 54 of the tire valve stem.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A valve stem for use in inflating a tubeless type tire mounted on a rim and provided with a safety inner tube, comprising a tapered, tubular body of rubbery material larger at its inner end than its outer end, a continuous groove in the exterior surface of said body completely surrounding the body for closely fitting and receiving in air sealing engagement the wall of a rim aperture, a metal base plate larger than said groove and substantially coextensive with the face of the inner end of said body secured to said face, said base plate having a central opening aligned with the bore of the body, a first tubular metal reinforcement liner within said body and adjacent said groove, a second tubular metal reinforcement liner surrounding the outer end of the bore of said body and terminating inwardly at a level spaced from the first liner whereby to permit reduction of the cross section of said body in the area between said liners during insertion of the body into a rim opening for clamping engagement of said continuous groove with a rim, at least one lateral groove in said base plate opening through its inner surface and communicating with the bore of the body to direct inflating air from said bore in a path substantially parallel to the inner surface of a rim, and a cover of soft material overlying the inner surface of said base plate to protect an inner tube from chafing against the edges of said base plate and lateral groove.

2. A valve stem according to claim 1 wherein said first tubular liner and metal base plate are integral with each other.

3. A valve stem according to claim 1 wherein is provided a plurality of lateral grooves each extending radially from said central opening in the base plate.

References Cited in the file of this patent
UNITED STATES PATENTS

| | | |
|---|---|---|
| 2,124,909 | Crowley | July 26, 1938 |
| 2,233,173 | McCoy | Feb. 25, 1941 |
| 2,269,367 | Gora | Jan. 6, 1942 |
| 2,322,500 | Armstrong | June 22, 1943 |
| 2,608,235 | Wyman | Aug. 26, 1952 |
| 2,798,528 | Herzegh | July 9, 1957 |
| 2,861,619 | Wyman | Nov. 25, 1958 |